United States Patent
Lee et al.

(10) Patent No.: US 10,403,434 B2
(45) Date of Patent: Sep. 3, 2019

(54) CAPACITOR COMPONENT

(71) Applicant: SAMSUNG ELECTRO-MECHANICS CO., LTD., Suwon-si, Gyeonggi-do (KR)

(72) Inventors: Young Il Lee, Suwon-si (KR); Byeong Cheol Moon, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/856,701

(22) Filed: Dec. 28, 2017

(65) Prior Publication Data
US 2019/0027309 A1    Jan. 24, 2019

(30) Foreign Application Priority Data
Jul. 19, 2017 (KR) .................. 10-2017-0091643

(51) Int. Cl.
*H01G 4/005* (2006.01)
*H01G 4/018* (2006.01)
*H01G 4/224* (2006.01)

(52) U.S. Cl.
CPC ............ *H01G 4/005* (2013.01); *H01G 4/018* (2013.01); *H01G 4/224* (2013.01)

(58) Field of Classification Search
CPC .......... H01G 4/30; H01G 4/228; H01G 4/328; H01G 4/005; H01G 4/008; H01G 4/012; H01G 4/12
See application file for complete search history.

(56) References Cited

U.S. PATENT DOCUMENTS

| | | | |
|---|---|---|---|
| 10,074,478 B2* | 9/2018 | Saeki | H01G 4/008 |
| 2009/0122460 A1* | 5/2009 | Gschwandtner | H01G 4/008 361/305 |
| 2009/0147445 A1* | 6/2009 | Kuriyama | C01B 21/0617 361/523 |
| 2010/0284125 A1 | 11/2010 | Moon et al. | |
| 2011/0298578 A1* | 12/2011 | Feichtinger | H01C 7/10 338/20 |
| 2011/0310526 A1 | 12/2011 | Sneh et al. | |

(Continued)

FOREIGN PATENT DOCUMENTS

| | | |
|---|---|---|
| JP | 2008-294325 A | 12/2008 |
| KR | 10-0836131 B1 | 6/2008 |
| WO | 2017/026281 A1 | 2/2017 |

OTHER PUBLICATIONS

Office Action issued in Korean Patent Application No. 10-2017-0091643, dated Aug. 16, 2018.

*Primary Examiner* — Nguyen T Ha
(74) *Attorney, Agent, or Firm* — Morgan, Lewis & Bockius LLP

(57) ABSTRACT

A capacitor component includes a body, and first and second external electrodes formed on external surfaces of the body. The body includes a first connection electrode connected to the first external electrode, a second connection electrode disposed on the first connection electrode to partially cover the first connection electrode and connected to the second external electrode, and a porous capacitor portion disposed to cover the first and second connection electrodes and connected to each of the first and second connection electrodes.

19 Claims, 12 Drawing Sheets

(56) References Cited

U.S. PATENT DOCUMENTS

| | | | |
|---|---|---|---|
| 2012/0099242 A1* | 4/2012 | Ohyama | H01G 9/012 361/303 |
| 2013/0321984 A1* | 12/2013 | Masuda | H01G 9/15 361/524 |
| 2015/0332863 A1* | 11/2015 | Ahopelto | H01G 11/28 257/532 |
| 2017/0040114 A1 | 2/2017 | Saeki et al. | |
| 2018/0174751 A1 | 6/2018 | Saeki et al. | |

* cited by examiner

CAPACITOR COMPONENT

CROSS-REFERENCE TO RELATED APPLICATION(S)

This application claims the benefit of priority to Korean Patent Application No. 10-2017-0091643 filed on Jul. 19, 2017 in the Korean Intellectual Property Office, the disclosure of which is incorporated herein by reference in its entirety.

TECHNICAL FIELD

The present disclosure relates to a capacitor component.

BACKGROUND

A capacitor is mounted on the printed circuit boards of several electronic products such as an image display apparatus, for example, a liquid crystal display (LCD), a plasma display panel (PDP), or the like, a computer, a smartphone, a cellular phone, and the like, to serve to charge electricity therein or discharge electricity therefrom. Recently, in accordance with the thinning of portable information technology (IT) products such as smartphones, wearable devices, and the like, the necessity for thinness of a passive element for reducing an overall thickness of a package has also increased.

In accordance with such a trend, demand for a thin film capacitor that may allow for the implementation of a reduced thickness has also increased, and the thin film capacitor has an advantage that a thin capacitor may be implemented using thin film technology. In addition, the thin film capacitor has low equivalent series inductance (ESL), unlike a multilayer ceramic capacitor according to the related art. Therefore, recently, research into using a thin film capacitor as a decoupling capacitor for an application processor (AP) has been undertaken. In order to use the thin film capacitor as the decoupling capacitor for an AP as described above, the thin film capacitor has been manufactured in land-side capacitor (LSC) form.

Meanwhile, in order to increase capacitance of a capacitor in a limited space, a trench type capacitor has been developed. Such a trench type capacitor is manufactured in a manner in which a trench is formed in a silicon substrate and a capacitor structure is then formed. Such a trench type capacitor is appropriate for increasing capacitance by increasing surface areas of electrodes, but requires relatively complicated semiconductor process technology, and it may be difficult to form a plurality of dielectrics in the trench when considering a thickness of a dielectric material satisfying breakdown voltage conditions, such that it may not be easy to implement ultra-high capacitance.

SUMMARY

An aspect of the present disclosure may provide a capacitor component capable of being implemented to have an ultra-high capacitance using a substrate having an increased surface area and being efficiently manufactured without using a semiconductor process.

According to an aspect of the present disclosure, a capacitor component may include: a body; and first and second external electrodes formed on external surfaces of the body. The body includes: a first connection electrode connected to the first external electrode, a second connection electrode disposed on the first connection electrode to partially cover the first connection electrode and connected to the second external electrode, and a porous capacitor portion disposed to cover the first and second connection electrodes and connected to each of the first and second connection electrodes.

The porous capacitor portion may include a porous body, a dielectric layer covering a surface of the porous body, and an electrode layer covering the dielectric layer.

The porous body may be formed of a conductive material and be connected to the first connection electrode, and the electrode layer may be connected to the second connection electrode.

The porous body may be formed of the same material as that of the first connection electrode.

The porous body may be formed of an electrically insulating material, and the porous capacitor portion may further include an additional electrode layer formed between the porous body and the dielectric layer and connected to the first connection electrode.

The porous body may be formed of a ceramic.

The porous body may have a shape in which a plurality of particles are aggregated.

The plurality of particles may have a spherical shape or a nanowire shape.

The body may further include an insulating layer disposed between the first and second connection electrodes.

The insulating layer may be formed of the same material as that of the dielectric layer of the porous capacitor portion.

The electrode layer may fill pores of the porous capacitor portion.

The second connection electrode may fill pores of the porous capacitor portion.

When the first and second connection electrodes and the porous capacitor portion are a single multilayer set, the body may include a plurality of multilayer sets.

The porous capacitor portion may be in contact with an upper surface of the first connection electrode.

The porous capacitor portion may be in contact with a side surface and an upper surface of the second connection electrode.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
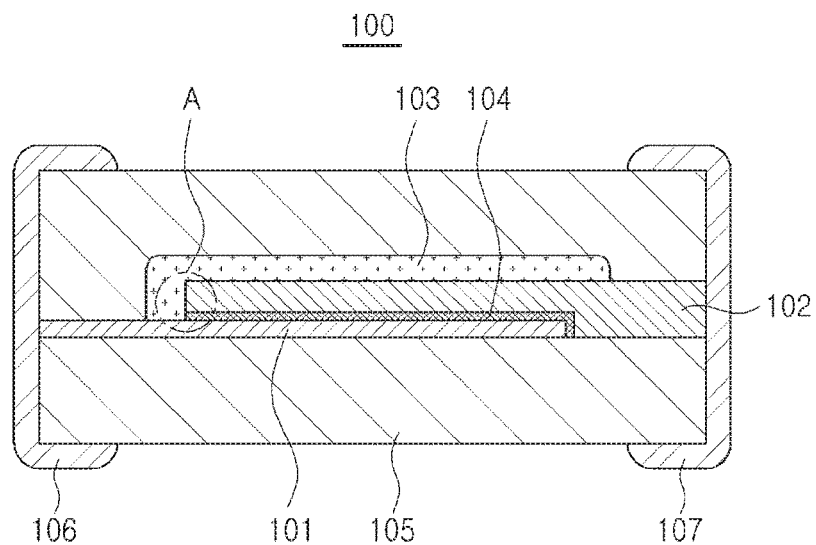
FIG. 1 is a schematic cross-sectional view illustrating a capacitor component according to an exemplary embodiment in the present disclosure.

Hereinafter, exemplary embodiments of the present disclosure will now be described in detail with reference to the accompanying drawings. In the accompanying drawings, shapes, sizes and the like, of the components may be exaggerated or shortened for clarity.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being 'on,' 'connected to,' or 'coupled to' another element, it can be directly 'on,' 'connected to,' or 'coupled to' the other element or other elements intervening therebetween may be present. In contrast, when an element is referred to as being 'directly on,' 'directly connected to,' or 'directly coupled to' another element, there may be no other elements or layers intervening therebetween. Like numerals refer to like elements throughout. As used herein, the term 'and/or' includes any and all combinations of one or more of the associated listed items.

It will be apparent that although the terms first, second, third, etc. may be used herein to describe various members, components, regions, layers and/or sections, any such members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as 'above,' 'upper,' 'below,' and 'lower' and the like, may be used herein for ease of description to describe one element's relationship relative to another element(s) as shown in the figures. It will be understood that spatially relative terms are intended to encompass different orientations of the device in use or operation, in addition to the orientation depicted in the figures. For example, if the device in the figures is turned over, elements described as 'above,' or 'upper' relative to other elements would then be oriented 'below,' or 'lower' relative to the other elements or features. Thus, the term 'above' can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms 'a,' 'an,' and 'the' are intended to include the plural forms as well, unless the context clearly indicates otherwise. It will be further understood that the terms 'comprises,' and/or 'comprising' when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted alone, in combination or in partial combination.

The contents of the present disclosure described below may have a variety of configurations and propose only a required configuration herein, but are not limited thereto.

FIG. 1 is a schematic cross-sectional view illustrating a capacitor component according to an exemplary embodiment in the present disclosure. FIGS. 2 through 6 are enlarged views illustrating a form in the vicinity of a porous capacitor portion in the capacitor component of FIG. 1.

Referring to FIG. 1, a capacitor component 100 according to an exemplary embodiment in the present disclosure includes a body 105 and first and second external electrodes 106 and 107 formed on external surfaces of the body 105. The body 105 includes a first connection electrode 101, a second connection electrode 102, and a porous capacitor portion 103. In this case, an insulating layer 104 is disposed between the first connection electrode 101 and the second connection electrode 102 to electrically separate the first connection electrode 101 and the second connection electrode 102 from each other.

The body 105 may accommodate the porous capacitor portion 103 therein to have electrical insulating properties. The body 105 may be formed of a ceramic material, and may be obtained by sintering, for example, ceramic green sheets.

The first and second external electrodes 106 and 107 serve as external terminals of the capacitor component 100, and are connected to the first and second connection electrodes 101 and 102, respectively. The first and second external electrodes 106 and 107 may be formed of a material having high conductivity, and may be formed in a multilayer structure. For example, the first and second external electrodes 106 and 107 may be obtained by applying and sintering a conductive paste to surfaces of the body 105 and then forming plating layers on the surfaces of the body 105 to which the conductive paste is applied using a material such as Ni, Sn, Au, or the like.

The first connection electrode 101 is electrically connected to the porous capacitor portion 103. In detail, the first connection electrode 101 may be connected to one electrode of the porous capacitor portion 103, for example, a conductive porous body 111 in the present exemplary embodiment. The first connection electrode 101 may include a material such as Ni, Cu, Ag, Pt, or the like, having excellent conductivity, and may be obtained by applying a conductive paste on a ceramic green sheet and then sintering the conductive paste.

The second connection electrode 102 may be disposed on the first connection electrode 101 to partially cover the first connection electrode 101, and may be connected to the second external electrode 107, as in a form illustrated in FIG. 1. The second connection electrode 102 may also be formed of a material such as Ni, Cu, Ag, Pt, or the like, having excellent conductivity, and may be formed of a conductive polymer.

The porous capacitor portion 103 may be disposed to cover the first and second connection electrodes 101 and 102, and may be connected to each of the first and second connection electrodes 101 and 102. As an example, as in the form illustrated in FIG. 1, the porous capacitor portion 103 is in contact with a side surface and an upper surface of the second connection electrode 102 while being in contact with an upper surface of the first connection electrode 101.

Figure 2:
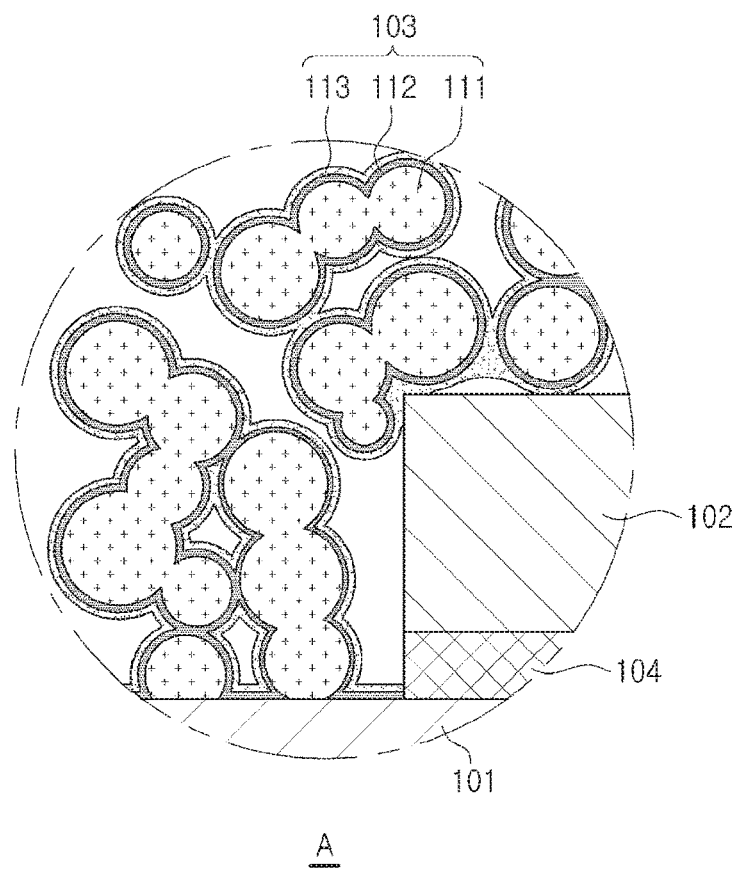
FIGS. 2 through 6 are enlarged views illustrating a form in the vicinity of a porous capacitor portion in the capacitor component of FIG. 1.
Figure 3:
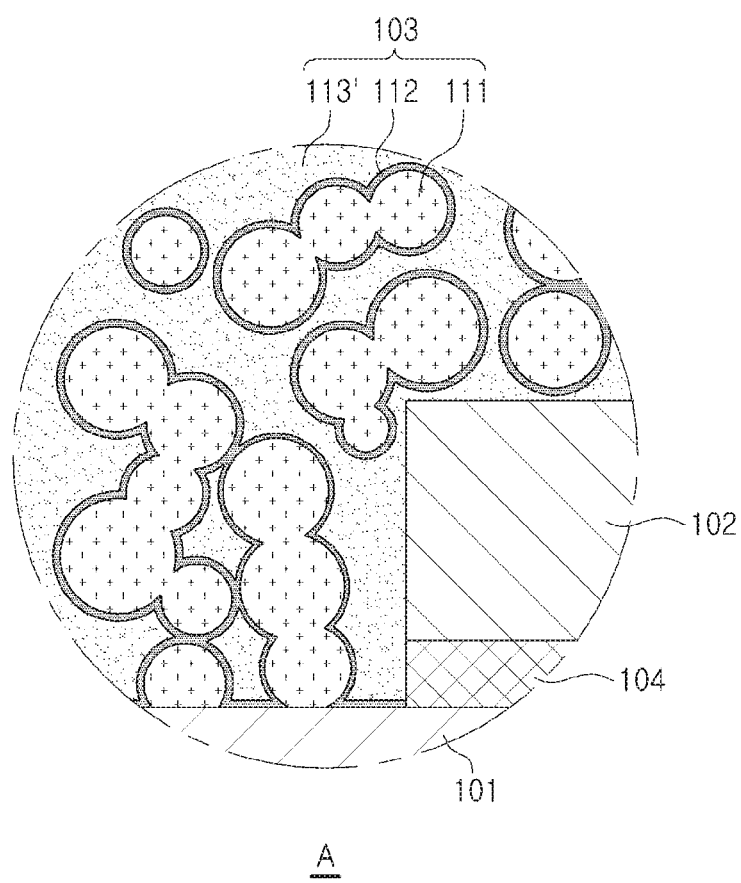
Figure 4:
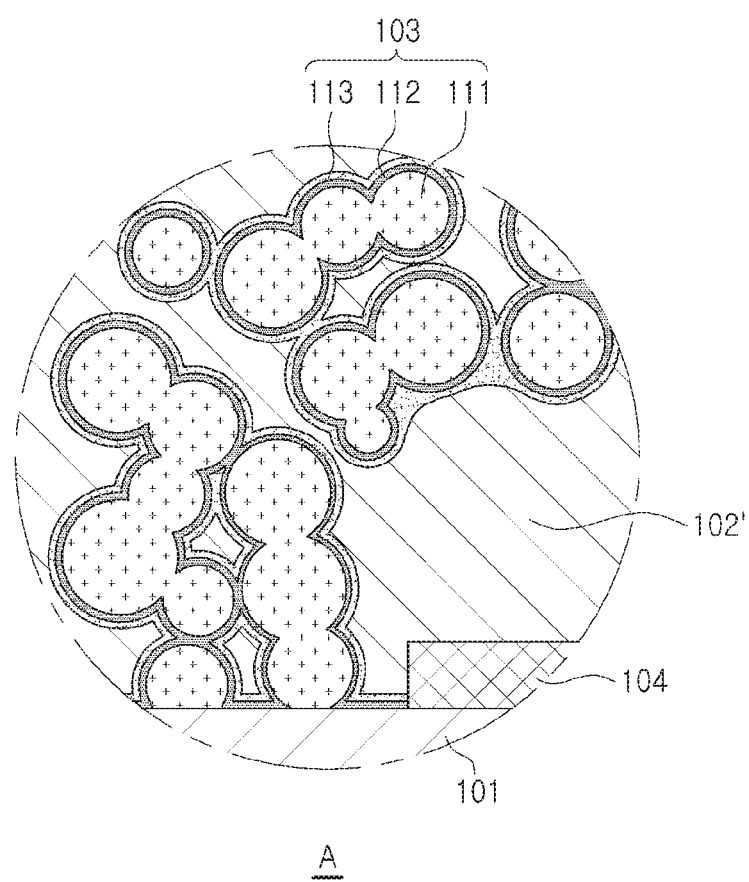
Figure 5:
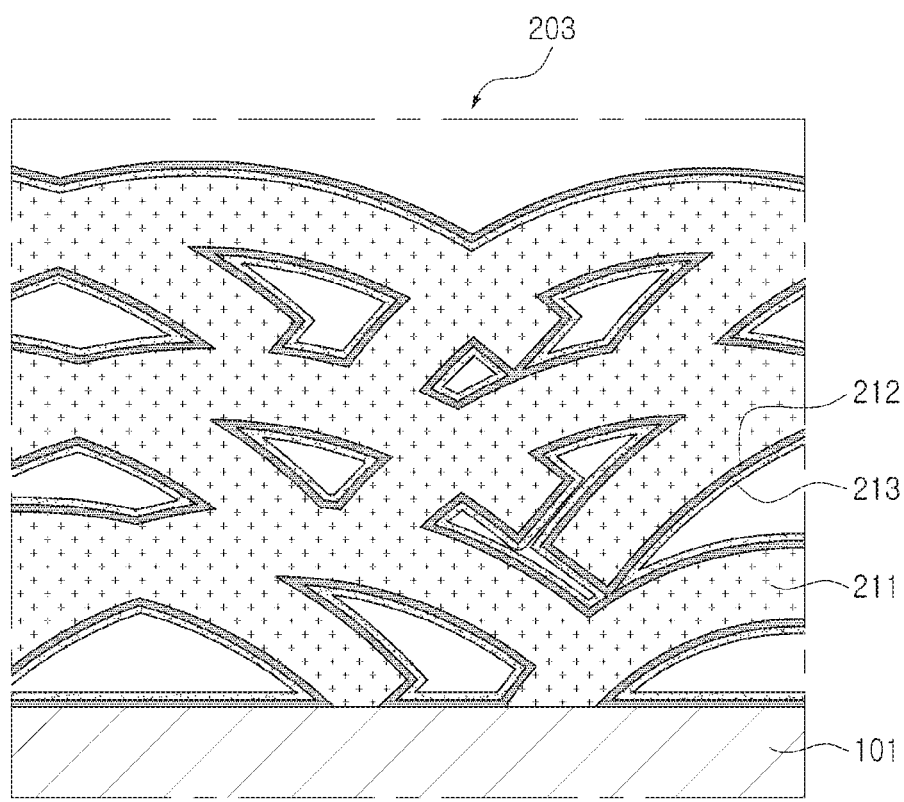
Figure 6:
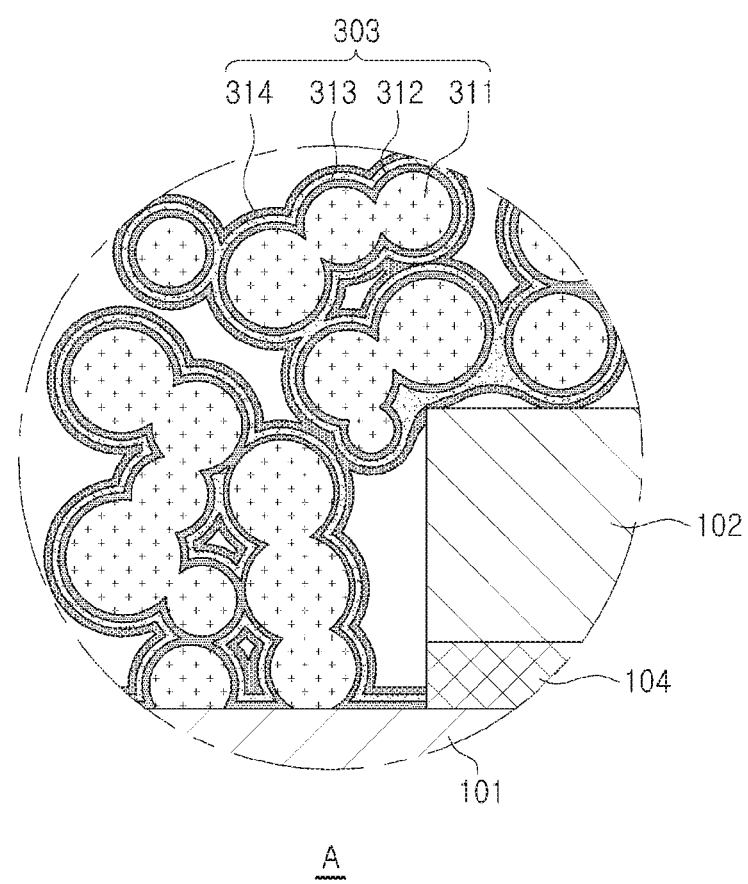

A detailed form of the porous capacitor portion 103 will be described with reference to FIG. 2. The porous capacitor portion 103 includes the porous body 111, a dielectric layer 112, and an electrode layer 113. In this case, the numbers of dielectric layers 112 and electrode layers 113 may be further increased, if necessary.

The porous body 111 may have a shape in which particles are aggregated. In some embodiments, the particles may be spherical in shape. In such embodiments, the particles may have a diameter in a range from about 10 nm to about 500 nm. However, the shape of the particles is not restricted to being spherical. For example, in various embodiments, the particles may be cylindrical, or hexahedral. A porous structure having an extended surface may be effectively obtained by such an aggregation. Such an aggregation shape may be obtained by sintering the particles and adjusting a condition such as a sintering temperature, or the like, so that complete densification is not generated. In this case, the porous body 111 may have a spherical shape as in a form illustrated in FIG. 2.

When the porous capacitor portion 103 having the porous structure as in the present exemplary embodiment is used, surface areas of the electrode layers, the dielectric layers, and the like, provided in the porous capacitor portion 103 may be increased, and the capacitor component 100 having a high capacitance may thus be implemented. In addition, a manufacturing process of the capacitor component may be simpler than that of a trench type capacitor, and the capacitor component may be implemented to have a higher capacitance than that of the trench type capacitor.

In the present exemplary embodiment, the porous body 111 may be formed of a conductive material to thus be connected to the first connection electrode 101. Therefore, the porous body 111 may serve as an electrode layer in the porous capacitor portion 103. In this case, the porous body 111 may be formed of a material appropriate for forming the porous structure, which is a material having high conductivity, and may be formed of the same material as that of the first connection electrode 101 in consideration of process efficiency, electrical characteristics, and the like. As described below, conductive particles having a particle size greater than that of particles of the first connection electrode 101 may be used in order to form the porous body 111. In a sintering process, the first connection electrode 101 may be densified, but the porous body 111 may be formed in the porous structure. In this case, both of the porous body 111 and the first connection electrode 101 may include Ni as a main component.

The dielectric layer 112 may cover a surface of the porous body 111, and may have, for example, a form in which it is coated on a surface of the porous body 111. In this case, elements of the porous capacitor portion 103, that is, the dielectric layer 112, the electrode layer 113, and the like, may be effectively formed by an atomic layer deposition (ALD) method such that pores of the porous structure have a fine size. However, in addition to the ALD method, another method that allows the pores of the porous structure to be coated may also be used. The dielectric layer 112 may be formed of a material such as alumina ($Al_2O_3$), $SiO_2$, $Sn_3N_4$, $ZrO_2$, $CaTiO_3$, $SrTiO_3$, $(Ba, Sr)TiO_3$, $BaTiO_3$, or the like, and may be formed of one material or a plurality of materials. In various embodiments, the dielectric layer may have a thickness of in a range from about 1 nm to about 500 nm. In this case, the dielectric layer 112 may be formed of the plurality of materials to improve an insulating property.

The insulating layer 104 disposed between the first and second connection electrodes 101 and 102 may be formed of any material having electrical insulating properties, and may be formed simultaneously with the dielectric layer 112 of the porous capacitor portion 103 in terms of process efficiency. Therefore, the insulating layer 104 may be formed of the same material as that of the dielectric layer 112.

The electrode layer 113 may cover the dielectric layer 112. In detail, the electrode layer 113 may be coated on a surface of the dielectric layer 112. The electrode layer 113 may serve as an electrode having an extended surface area in the porous capacitor portion 103, and may be connected to the second connection electrode 102. In this case, the electrode layer 113 may be formed of a metal having excellent electrical conductivity, such as Ag, Cu, Pt, Ni, TiN, or the like, and may be effectively formed on the surface of the dielectric layer 112 by a process such as an ALD process, or the like. Alternatively or in addition, an electrode layer 113' may fills pores of the porous capacitor portion 103 as in a modified example illustrated in FIG. 3. In this case, a contact area between the electrode layer 113' and the second connection electrode 102 may be increased, such that electrical characteristics may be improved. Further, as another modified example, as in a form illustrated in FIG. 4, a second connection electrode 102' may be provided in a form in which it fills pores of the porous capacitor portion 103. As described below, a second connection electrode 102 may be effectively filled in the pores in a form of a conductive paste or a conductive polymer having fluidity.

An example in which the particles constituting the porous body 111 have a spherical shape is described in the abovementioned exemplary embodiment, but the particles may have another shape. As in a form illustrated in a modified example of FIG. 5, particles constituting a porous body 211 may be nanowires or microwires. The nanowires or microwires may form a mesh structure and may be connected to each other. In addition, a porous capacitor portion 203 may be implemented by sequentially coating a dielectric layer 212 and an electrode layer 213 on an aggregation of the nanowires. In this case, the nanowires constituting the porous body 211 may include a material such as Ag, Ni, Cu, Pt, Sn, and Au, or the like, and may be connected to the first connection electrode 102 to serve as an electrode.

In addition, an example in which the porous body is formed of the conductive material is described in the abovementioned exemplary embodiment, the porous body may have electrical characteristics different from those of the conductive material. In detail, as in a form illustrated in a modified example of FIG. 6, a porous body 311 may be formed of an electrically insulating material, and may include a ceramic component such as alumina, or the like. Since the porous body 311 has electrical insulating properties, a porous capacitor portion 303 may further include an additional electrode layer 312 formed between the porous body 311 and a dielectric layer 313 and connected to the first connection electrode 101. In some embodiments, the electrode layer may have a thickness in a range from about 1 nm to about 500 nm. The additional electrode layer 312 may serve as an electrode forming capacitance of the porous capacitor portion 303, and may be called a first electrode layer, and an electrode layer 314 formed on a surface of the dielectric layer 313 and connected to the second connection electrode 102 may be called a second electrode layer. The first and second electrode layers 312 and 314 may be formed of the same materials, and may be obtained by ALD of TiN, or the like.

Figure 7:
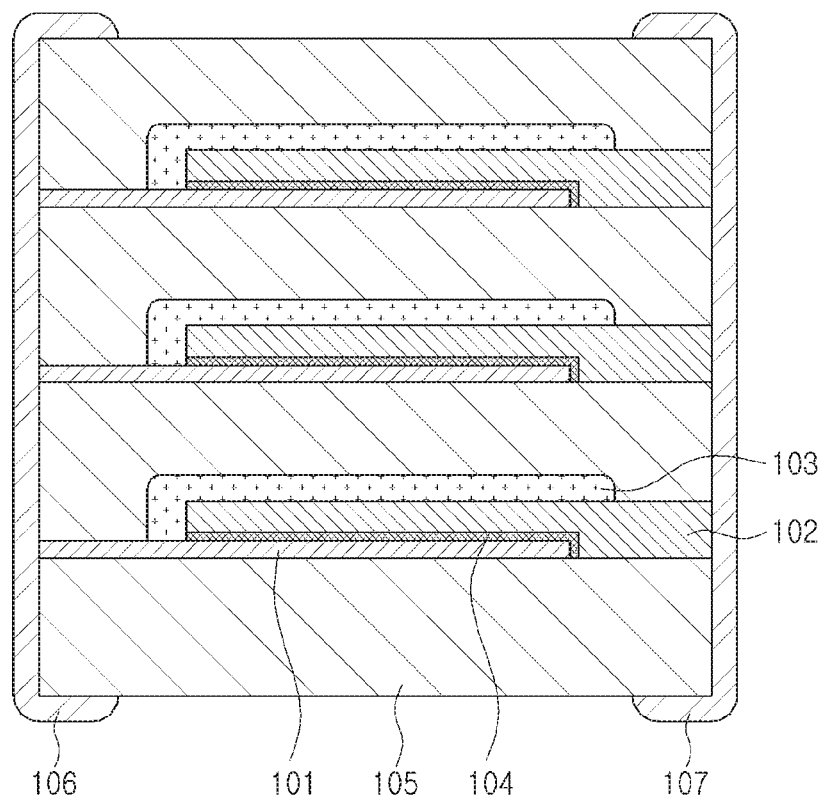
FIG. 7 is a schematic cross-sectional view illustrating a capacitor component according to another exemplary embodiment in the present disclosure.

FIG. 7 is a schematic cross-sectional view illustrating a capacitor component according to another exemplary embodiment in the present disclosure. In the present exemplary embodiment, a body of the capacitor component may include a plurality of porous capacitor portions 103 in order to further increase capacitance. In detail, when first and second connection electrodes 101 and 102 and a porous capacitor portion 103 are a single multilayer set, the body 105 may include a plurality of multilayer sets. The multilayer sets may be stacked in one direction, and the first and second connection electrodes 101 and 102 included in the multilayer sets may be connected to first and second external electrodes 106 and 107, respectively.

Figure 8:
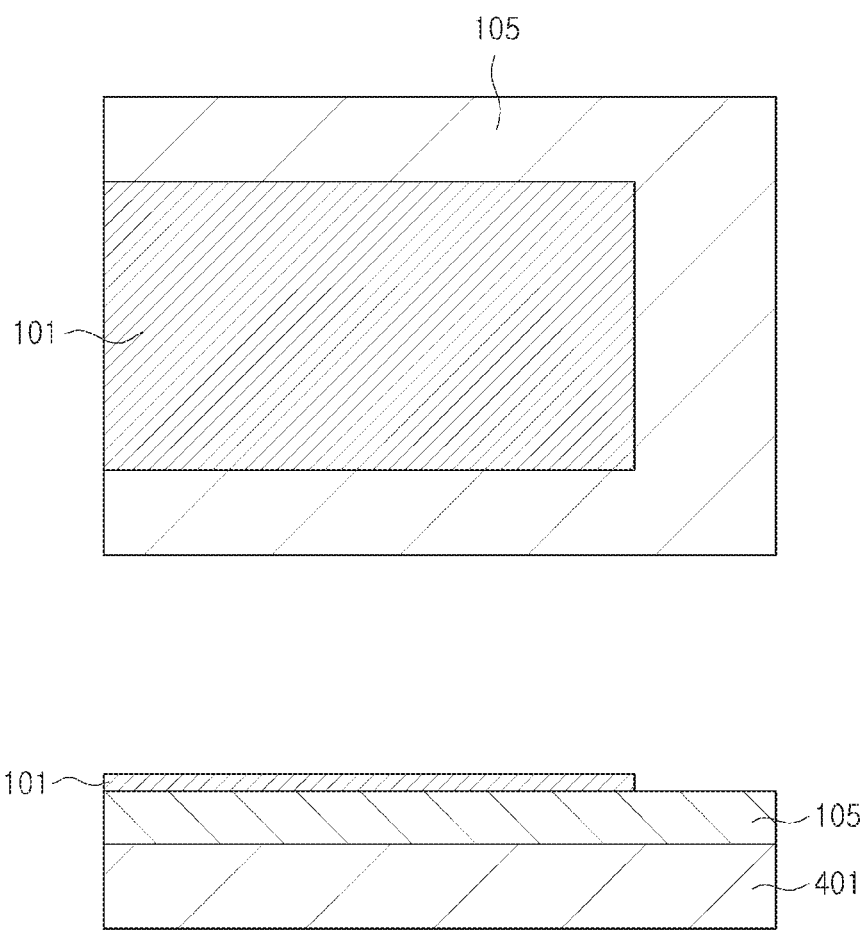
FIGS. 8 through 13 are views illustrating cross-sectional views of the capacitor component at various stages of manufacturing using a process of manufacturing according to an exemplary embodiment in the present disclosure.
Figure 9:
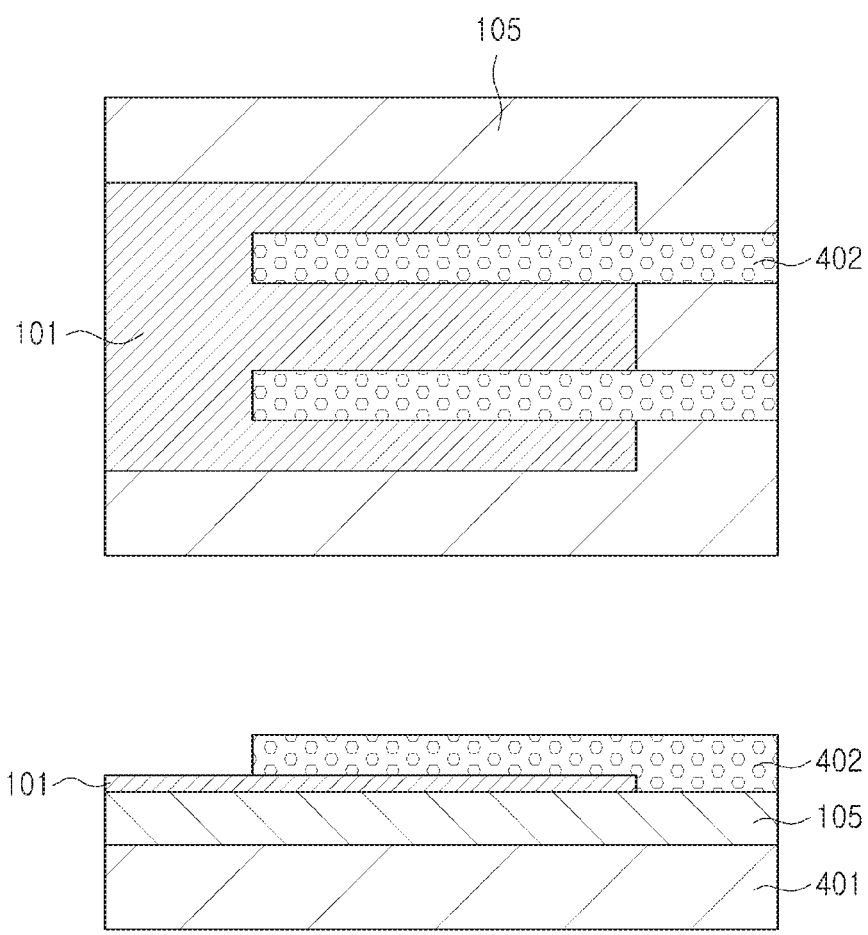
Figure 10:
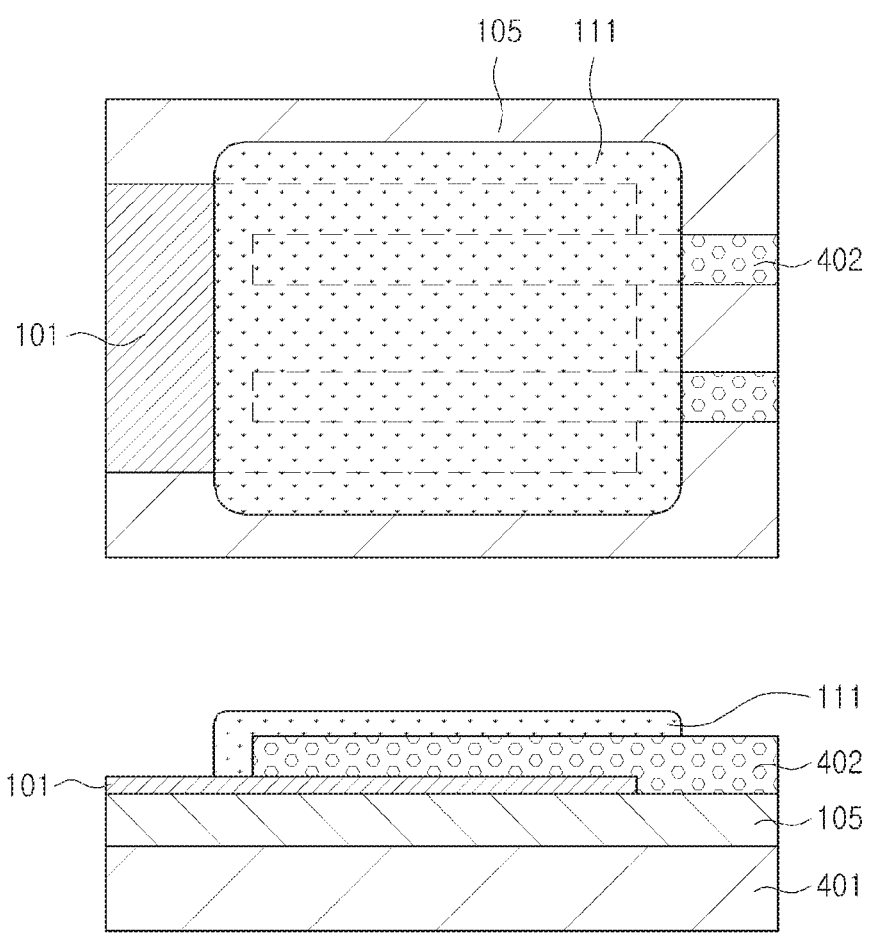

A method of manufacturing a capacitor component according to an exemplary embodiment in the present disclosure will hereinafter be described with reference to FIGS. 8 through 13. In FIGS. 8 to 10, upper drawings correspond to plan views, and lower drawings correspond to cross-sectional views corresponding to the plan views. A structure of the capacitor component described above may be more clearly understood from a description of a method of manufacturing a capacitor component to be described below. In addition, a method of manufacturing a capacitor component to be described below relates to a method of obtaining a structure illustrated in FIG. 7, but other modified examples may also be implemented in a similar manner on the basis of a method of manufacturing a capacitor component to be described below.

First, as in a form illustrated in FIG. 8, ceramic green sheets constituting the body 105 and a conductive paste for forming the first connection electrode 101 may be formed on a carrier film 401. The ceramic green sheets, in various embodiments, may have a thickness in a range from about 1 μm to about 1000 μm. The carrier film 401 may be a polyethylene terephthalate (PET) film, or the like. The conductive paste for forming the first connection electrode 101 may include conductive particles having a fine size, and may be densified by sintering, such that the first connection electrode 101 may be formed. In some embodiments, the conductive particles may have an average diameter in a range from about 1 nm to about 1000 nm. In various embodiments, the conductive particles may have a spherical shape. However, the shape of the conductive particles is not limited to being spherical. For example, in other embodiments, the conductive particles may have a cylindrical shape or a hexahedral shape. To this end, the conductive paste may include Ni particles having a nanosize. The conductive paste may include Ag particles, Cu particles, and the like, in addition to the Ni particles. The particles of Ag, Cu, etc. may also be nanosized in various embodiments. For example, in some embodiments, the particle size of Ag, Cu, etc. particles is in a range from about 1 nm to about 500 nm. The ceramic green sheets may be sintered together with the first connection electrode 101 to form the body 105, and may include a glass ceramic material having a low sintering temperature such as, for example, alumina.

Then, as in a form illustrated in FIG. 9, a sacrificial layer 402 covering the first connection electrode 101 and the body 105 may be formed. The sacrificial layer 402 may be removed in the subsequent process, such that a channel for forming the porous capacitor portion may be formed. In consideration of a function as the channel, the sacrificial layer 402 may be formed of a material that may be easily removed, for example, a polymer, and may be formed by a method of printing polymer beads, or the like. In various embodiments, the sacrificial may have a thickness in a range from about 1 μm to about 1000 μm. In consideration of a function for forming the channel, the sacrificial layer 402 may be implemented to have a rod shape.

Then, as in a form illustrated in FIG. 10, a paste for forming the porous body 111 may be applied to the sacrificial layer 402. The paste may include, for example, Ni particles. In this case, in order to implement a porous structure, the paste may include particles having a size greater than that of the particles of the paste for forming the first connection electrode 101. Therefore, at the time of sintering the first connection electrode 101, the porous body 111 is not completely densified, but may be formed in the porous structure in which it is partially sintered.

In addition, as in the modified example described above, the particles constituting the porous body 111 may be formed of an electrically insulating material, for example, a ceramic material such as alumina. When the porous body 111 is formed of the electrically insulating material, a process of manufacturing a porous capacitor portion 103 to be described below will be modified into a process of sequentially forming the first electrode layer, the dielectric layer, and the second electrode layer on a surface of the porous body 111.

In order for the porous body 111 to have a larger number of pores and an extended surface, polymer beads may be added to the paste for forming the porous body 111. The beads in various embodiments may have any suitable shape such as, for example, spherical, cylindrical or hexahedral. In embodiments, where the beads are spherical, the average diameter of the beads may be in a range from about 100 nm to about 50 μm. The polymer beads may be added in an amount that would constitute a volume ratio in a range from about 10 vol % to about 70 vol %. The polymer beads may be mainly formed of an acrylic component, spaces occupied by the polymer beads may remain pores at the time of performing sintering, such that the porous body 111 may have the larger number of pores and the extended surface, and a capacitor portion manufactured from the porous body 111 may have a higher capacitance. In this case, all the polymer beads are not always removed at the time of performing the sintering, and some of the polymer components may remain in the porous body 111 after the sintering.

Figure 11:
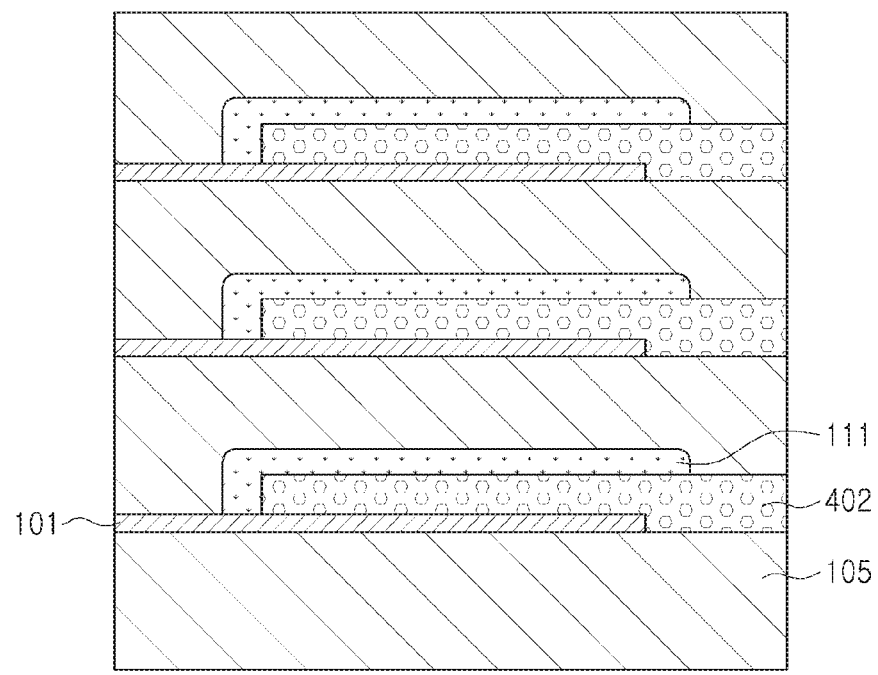

Then, a plurality of unit capacitor portions obtained through the abovementioned processes may be manufactured, and be then stacked as in a form illustrated in FIG. 11. In the present stacking process, the carrier film 401 may be separated from the body 105. When a capacitor component having only one porous capacitor portion is manufactured, the present stacking process may not be performed.

Figure 12:
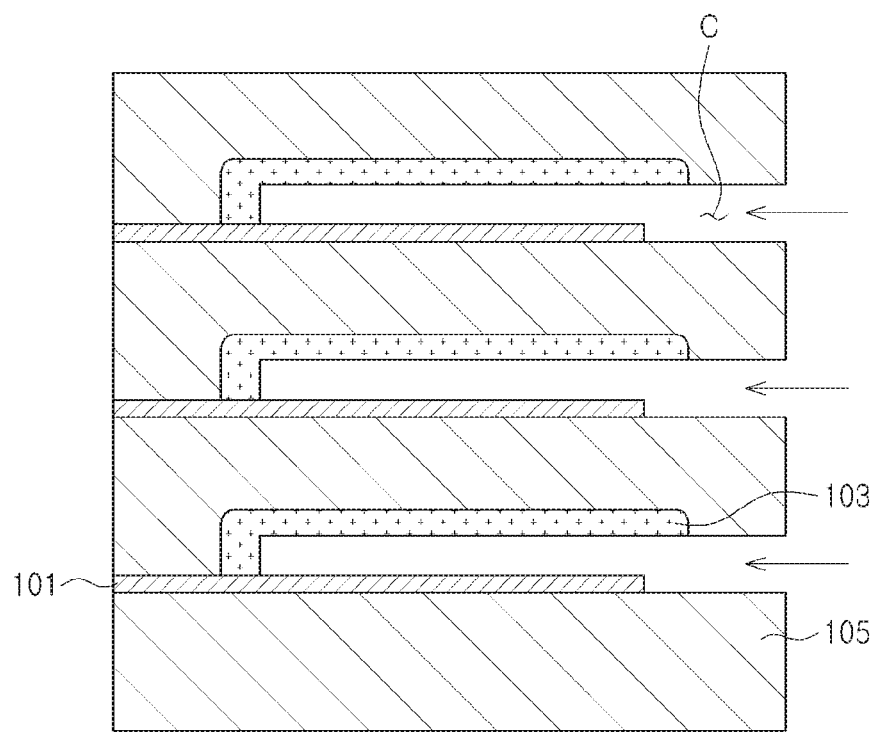

Then, a laminate obtained as described above may be sintered, and in this process, the sacrificial layers may be removed as in a form illustrated in FIG. 12, such that channels C may be formed. In various embodiments, the sintering process may be carried at any suitable temperature depending on the size of the particles in the electrode paste. For example, the sintering process may be carried out at a temperature in a range from about 500° C. to about 1200° C. As described above, the body 105, which is a sintered body, and the first connection electrodes 101 may be obtained through the present sintering process, and the porous bodies 111 that are not completely densified may have the porous structures by aggregation of the particles. After the sintering process, the dielectric layers, the electrode layers, and the like, may be sequentially formed on the surfaces of the porous bodies 111 through the channels C formed by the removal of the sacrificial layers to form the porous capacitor portions 103. As described above, the dielectric layers, the electrode layers, and the like, may be effectively formed by the ALD process. The dielectric layer may be formed of a suitable material such as, for example, alumina, $SiO_2$, $Sn_3N_4$, $ZrO_2$, $CaTiO_3$, $SrTiO_3$, $(BaSr)TiO_3$, $BaTiO_3$, etc. Any suitable process may be used for depositing the dielectric layers and/or the electrode layers. For example, in some embodiments these layers may be deposited using a CVD process with suitable raw materials. The dielectric layers and the electrode layers may have a thickness in a range from about 1 nm to about 500 nm in various embodiments. In addition, the insulating layers 104 may be formed simultaneously with the dielectric layers in a process of forming the dielectric layers. However, the insulating layers 104 may also be formed in a separate process. Meanwhile, although not illustrated, a process of removing the electrode layers formed in regions other than the porous capacitor portions 103 by a method such as a polishing method, or the like, may be additionally performed.

Figure 13:
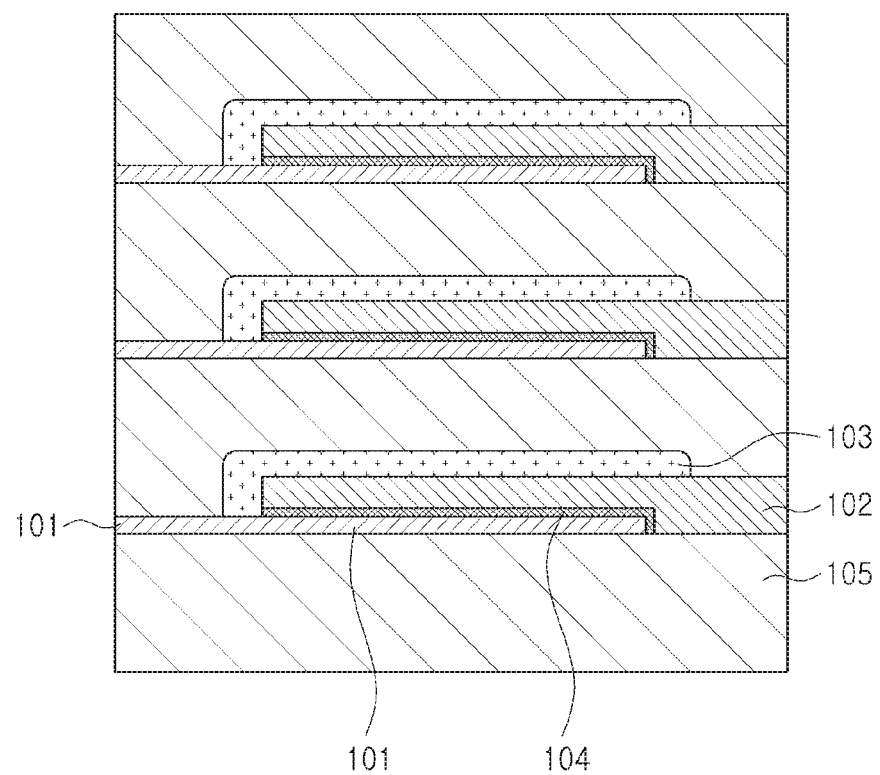

Then, as in a form illustrated in FIG. 13, the second connection electrodes 102 may be formed in regions of the channels C to be connected to the porous capacitor portions 103. The second connection electrodes 102 may be formed by a method of electroplating a material such as Ni, or the like, a method of filling a conductive polymer, or the like. Then, the external electrodes 106 and 107 may be formed on the surfaces of the body 105 to obtain the capacitor component illustrated in FIG. 7.

As set forth above, according to the exemplary embodiments in the present disclosure, a capacitor component having an ultra-high capacitance using a substrate having an increased surface area may be implemented. In addition, such a capacitor component may be efficiently manufactured without using a semiconductor process.

While exemplary embodiments have been shown and described above, it will be apparent to those skilled in the art that modifications and variations could be made without departing from the scope of the present invention as defined by the appended claims.

What is claimed is:

1. A capacitor component comprising:
   a body; and
   first and second external electrodes formed on external surfaces of the body,
   wherein the body includes:
      a first connection electrode connected to the first external electrode,
      a second connection electrode disposed on the first connection electrode to partially cover the first connection electrode and connected to the second external electrode, and
      a porous capacitor portion disposed to cover the first and second connection electrodes and connected to each of the first and second connection electrodes.

2. The capacitor component of claim 1, wherein the porous capacitor portion includes a porous body, a dielectric layer covering a surface of the porous body, and an electrode layer covering the dielectric layer.

3. The capacitor component of claim 2, wherein the porous body is formed of a conductive material and is connected to the first connection electrode, and the electrode layer is connected to the second connection electrode.

4. The capacitor component of claim 3, wherein the porous body is formed of the same material as that of the first connection electrode.

5. The capacitor component of claim 2, wherein the porous body has a shape in which particles are aggregated.

6. The capacitor component of claim 5, wherein the particles have a spherical shape or a wire shape.

7. The capacitor component of claim 2, wherein the body further includes an insulating layer disposed between the first and second connection electrodes.

8. The capacitor component of claim 7, wherein the insulating layer is formed of the same material as that of the dielectric layer of the porous capacitor portion.

9. The capacitor component of claim 2, wherein the electrode layer fills pores of the porous capacitor portion.

10. The capacitor component of claim 2, wherein the second connection electrode fills pores of the porous capacitor portion.

11. The capacitor component of claim 1, wherein the body includes a plurality of multilayer sets, each of the plurality of multilayer sets includes the first and second connection electrodes and the porous capacitor portion.

12. The capacitor component of claim 1, wherein the porous capacitor portion is in contact with an upper surface of the first connection electrode.

13. The capacitor component of claim 12, wherein the porous capacitor portion is in contact with a side surface and an upper surface of the second connection electrode.

14. The capacitor component of claim 1, wherein the porous capacitor portion is disposed on the second connection electrode to cover the portion of the second connection electrode covering the first connection electrode.

15. The capacitor component of claim 1, wherein the second connection electrode is disposed above the first connection electrode in a stacking direction to partially cover the first connection electrode in the stacking direction, and
   the porous capacitor portion is disposed above the first and second connection electrodes in the stacking direction, including above a portion of the second connection electrode disposed above the first connection electrode in the stacking direction.

16. The capacitor component of claim 1, wherein the porous capacitor portion is disposed to cover an upper surface of the first connection electrode, and a side surface and an upper surface of the second connection electrodes electrode.

17. The capacitor component of claim 1, wherein the second connection electrode extends above an upper surface of the first connection electrode and along a side surface of the first connection electrode.

18. A capacitor component comprising:
   a body; and
   first and second external electrodes formed on external surfaces of the body,
   wherein the body includes:
      a first connection electrode connected to the first external electrode,
      a second connection electrode disposed on the first connection electrode to partially cover the first connection electrode and connected to the second external electrode, and
      a porous capacitor portion disposed to cover the first and second connection electrodes and connected to each of the first and second connection electrodes,
   wherein the porous capacitor portion includes a porous body formed of an electrically insulating material, a dielectric layer covering a surface of the porous body, an electrode layer covering the dielectric layer, and an additional electrode layer formed between the porous body and the dielectric layer and connected to the first connection electrode.

19. The capacitor component of claim 18, wherein the porous body is formed of a ceramic.

* * * * *